Figure 1:
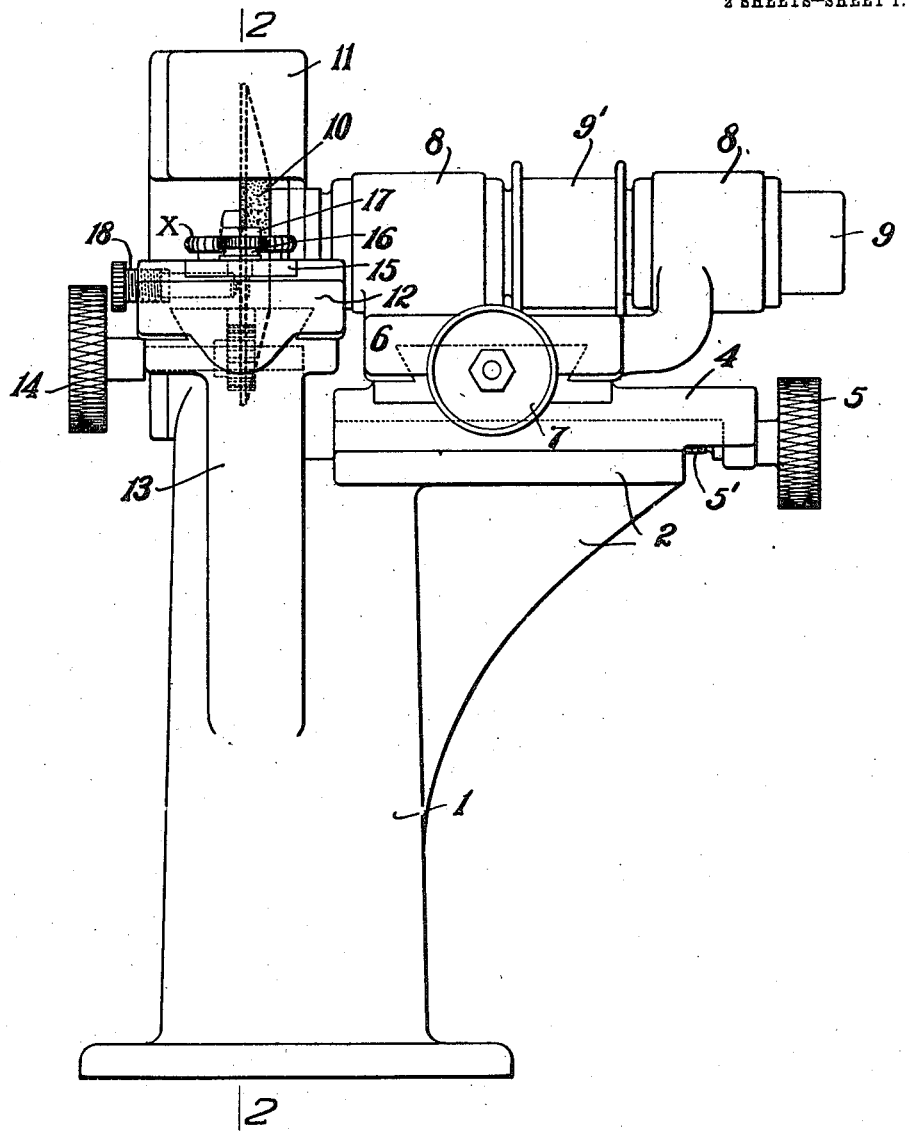

J. W. BOYNTON.
GRINDING MACHINE.
APPLICATION FILED JULY 28, 1910.
1,052,649.
Patented Feb. 11, 1913.
2 SHEETS—SHEET 2.
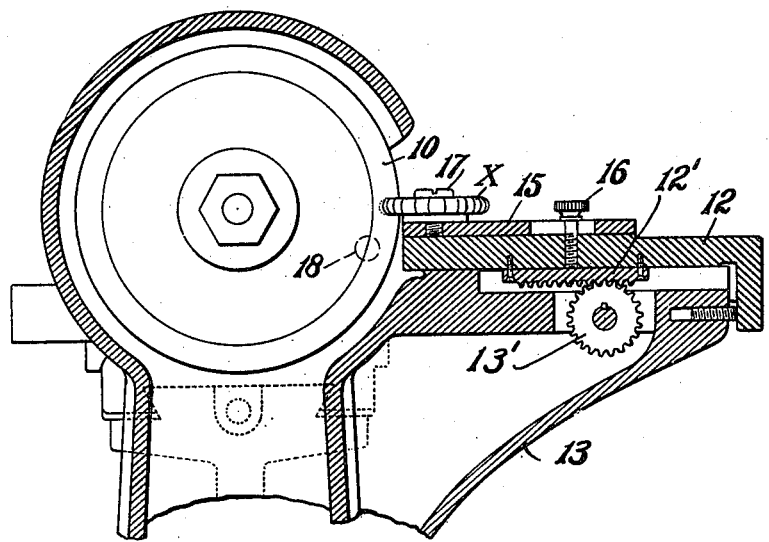
FIG. 2
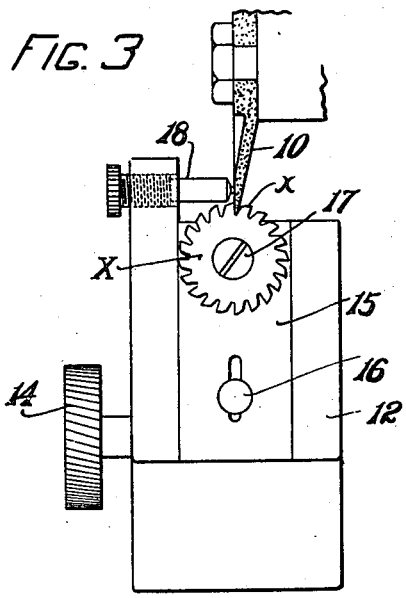
FIG. 3
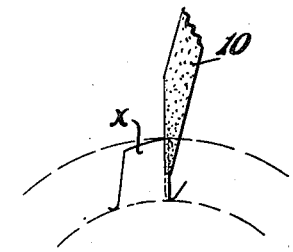
FIG. 4
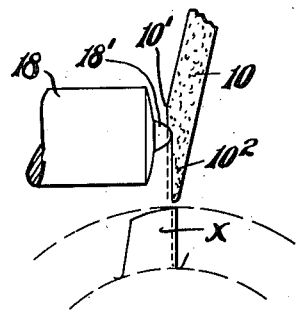
FIG. 5
WITNESSES
L. D. Goodwin
R. B. Ellms
INVENTOR
JOHN W. BOYNTON
BY 
ATTY.

UNITED STATES PATENT OFFICE.

JOHN W. BOYNTON, OF ATHOL, MASSACHUSETTS, ASSIGNOR TO UNION TWIST DRILL COMPANY, OF ATHOL, MASSACHUSETTS, A CORPORATION OF MASSACHUSETTS.

GRINDING-MACHINE.

1,052,649. Specification of Letters Patent. Patented Feb. 11, 1913.

Application filed July 28, 1910. Serial No. 574,366.

*To all whom it may concern:*

Be it known that I, JOHN W. BOYNTON, a citizen of the United States, residing at Athol, county of Worcester, Commonwealth of Massachusetts, have invented certain new and useful Improvements in Grinding-Machines, of which the following is a specification.

This invention relates to grinding machines and particularly to a grinder or sharpener for milling machine cutters. In sharpening these cutters it is a matter of great difficulty to effect a grinding of the radial cutting face of the tool which will leave the points of the teeth equidistant from the axis of rotation. This feature of the sharpening, which is of the greatest importance, is complicated on account of the rearward clearance of the cutter teeth. It is, of course, obvious that in a succession of cutter teeth which are calculated to take off a chip of say two one thousandth part of an inch in thickness, any variation in the length of the points of the teeth will render ineffective those teeth which are shorter than the maximum, thus retarding the speed at which the work may be done.

It is the object of my present invention to provide for the grinding of cutter teeth so as to produce absolute uniformity in the length of the points of the teeth and otherwise to secure identity of treatment in the successive teeth of the cutters being ground. I accomplish this essential feature by introducing a stop in the path of the abrading disk which shall be effective not only to protect the teeth of the cutter against an excessive grinding, but, which would also co-act with the disk itself to keep it true at all times.

The construction and operation of my device will be more fully described in the specification which follows and in the drawings which form a part of the specification I have shown as an illustrative embodiment of my invention a machine including in its structure a form of my invention which I have found well adapted to practical use.

Throughout specification and drawing like reference numerals are employed to indicate corresponding parts and in the drawings:—Figure 1 is a side view of my machine, Fig. 2 is a partial front view partly in vertical section of the grinding wheel and cutter feed, Fig. 3 is a plan view in partial horizontal section, Fig. 4 is a fragmentary view of a portion of the grinding wheel at work on a tooth, and Fig. 5 is a similar view illustrating the effect of the interposed stop.

Upon a suitable base 1 of my grinding machine is formed a lateral bracket 2 which carries a bed 3 upon which a slide 4 is longitudinally movable by a screw $5^1$ controlled by a milled knob 5. 6 is a cross slide controlled by a second milled knob 7 and upon this cross slide are suitable bearings 8, within which is journaled a spindle 9 turned by a pulley $9^1$. On the end of the spindle 9 is an emery wheel 10 protected by a hood 11. 13 is a second bracket supporting a work slide 12 which is moved by a rack $12^1$ engaged by a pinion $13^1$ which is controlled by a knob 14.

15 is a plate adjustably held on the slide 12 by a set screw 16 which passes through a slot in the plate.

17 is a screw stud for holding a cutter X.

On the forward end of the slide 12 is adjustably mounted a stud 18 which has a carbon or so called diamond point $18^1$ in its end. This point constitutes a stop and truing point for the abrasive wheel 10. The function and operation of this stop may perhaps best be understood by a description of the operation of my device in grinding the teeth $x$ of the cutter X. The operation is as follows:—First, adjust the diamond truing point $18^1$ to the central plane of the stud 17 and true off the front face of the emery wheel by advancing the wheel by means of the knob 5 and by moving the slide 15 back and forth by turning the knob 14. Supposing that the proper plate 15 has been selected which has the screw stud 17 of the desired size for the cutter which is to be sharpened, the cutter is then clamped in place, as indicated in Figs. 2 and 3.

In setting the cutter, the tooth $x$, which is to be sharpened, is rotated past the true plane which passes through the point $18^1$ and the center of the stud 17 by a distance of from one to two thousandths of an inch, which is the amount of cut or grind to be taken off. By turning the knobs 5 and 4 gradually the tooth $x$ of the cutter X is successively brought past the working face of the wheel 10 which is gradually advanced by turning the knob 5. The relative position of the tooth and the emery disk during such an advance of the cutter is illustrated in Fig. 4 in which the working face of the disk 10 is shown to have advanced part way in its cut along the face of the tooth as the latter has been moved up past it.

As it is, of course, necessary that the attendant of the machine work the slides rapidly there is an obvious liability to advance the grinding wheel 10 too far, and a slight excess of turn on the knob 5 at the last traverse of the slide 15 would carry the face of the wheel beyond the plane to be cut. It is to be noted, however, that the stop and truing point $18^1$ has been set in the exact plane of the ultimate face which is sought and which is to be reached by the grinding. Supposing, therefore, that the wheel 10 be advanced a little too far. As the slide 15 comes forward the truing point and stop $18^1$ begins to travel across the working face of the disk 10, as indicated in Fig. 5. In this figure, $10^1$ indicates the original working face and $10^2$ indicates the trued off working face which has been passed over by the point $18^1$. It will be seen, therefore, that the face $10^2$ is now exactly in the plane of the face which is sought. I have indicated the ultimate face thus sought by dotted lines on this tooth in this figure. It will thus be seen that it is possible for the workman to grind the tooth with great rapidity and as a matter of actual practice the grinding wheel 10 on the last cut is brought up until the workman hears the easily distinguishable sound of the diamond point $18^1$ in contact with the surface $10^1$ of the wheel 10. This, of course, wears away the wheel, but, the wear is so slight that it is fully compensated for by the fact that the surface is trued and kept trued for each tooth.

The great advantages of this simple combination of elements will be readily understood by those skilled in the art. It makes of the truing point a protective stop beyond which the face of the cutting wheel may not be advanced by the very fact that the point $18^1$ removes the face before it comes in contact with the tooth of the cutter. This, of course, assures a perfection of grinding in the cutters and makes possible a uniformity in the tooth length.

Various modifications in the arrangement of the point and in the construction of the various parts of the machine may obviously be made, all without departing from the spirit of my invention if within the limits of the appended claim.

What I, therefore, claim and desire to secure by Letters Patent is:—

In a machine for grinding milling machine cutters, an abrading wheel, means for supporting said wheel, said means being longitudinally and laterally movable, a supporting slide for a toothed cutter laterally movable with respect to said abrading wheel, means for moving said slide and a stop on said slide oppositely disposed to be effective in the longitudinal movement of said abrading wheel and adjustable to the true plane of the desired face of the cutter tooth to be ground.

In testimony whereof I affix my signature in presence of two witnesses.

JOHN W. BOYNTON.

Witnesses:
C. STANLEY NEWTON,
SIMON MCKAY.